Dec. 12, 1967 W. KISCHIO 3,357,795
METHOD OF PRODUCING OR RECRYSTALLISING BORONPHOSPHIDE
Filed Oct. 12, 1964

*INVENTOR.*
WERNER KISCHIO
BY
AGENT

United States Patent Office 3,357,795
Patented Dec. 12, 1967

3,357,795
METHOD OF PRODUCING OR RECRYSTALLISING BORONPHOSPHIDE
Werner Kischio, Aachen, Germany, assignor to North American Philips Company, Inc., New York, N.Y., a corporation of Delaware
Filed Oct. 12, 1964, Ser. No. 403,055
Claims priority, application Germany, Oct. 28, 1963, N 23,943
5 Claims. (Cl. 23—204)

The present invention relates to a method of producing or recrystallising boronphosphide. Boronphosphide is a semiconductor material having a large energy gap between the valence band and the conduction band; it is interesting for use as a semiconductor, particularly at higher temperatures. However, boronphosphide has a very high melting temperature (about 3000° C.) and dissociates at high temperatures below the melting temperature. The production thereof from the elements requires a high reaction temperature and a high phosphorus vapour pressure. In most cases material is obtained which has a low phosphorous content. Moreover, no liquids are known in which the boronphosphide can be dissolved without decomposition and be recrystallised without impurities so that it is difficult to obtain boronphosphide in the pure crystalline state. The present invention has for its object inter alia to provide a method of the kind set forth in which the production and the recrystallisation of boronphosphide can be carried out at comparatively low temperatures. According to the invention, boronsulphide in the form of the vapour is caused to react with phosphorus or a phosphorous compound. The term "boronsulphide" is not restricted here to the compound consisting of boron and sulphur $B_2S_3$, but it refers also to other boron-sulphur compounds such as $B_2S_5$ or mixtures of boron-sulphur compounds of different compositions.

The reaction between vaporous boronsulphide and elementary phosphorus can be effectively carried out at a temperature lying between 400° C. and 1100° C. At temperatures below 600° C. the crystals obtained are usually very small. Therefore, if it is desired to obtain not too small crystals, a temperature of at least 600° C. is preferred for the reaction.

It has furthermore been found that the reaction: boronsulphide and phophorus yield boronphosphide and sulphur and/or sulphur-phosphorus is reversible. Therefore, the reaction is suitable for the recrystallisation of boronphosphide by transport reaction. To this end at one place boronphosphide is caused to react with sulphur by heating so that boronsulphide is formed, whereas at a further place, at a lower temperature than at the first mentioned place, the boronphosphide is regained. At the first place heating is preferably performed at a temperature above 1100° C.

The production and/or recrystallisation of boronphosphide according to the invention is preferably carried out in a closed vessel. Use may be made of an inert gas atmosphere, for example of a rare gas in the vessel. The use of an exhausted vessel is preferred.

When boronphosphide is recrystallised in accordance with the invention in a closed vessel, sulphur may be used as a transport agent. Use is preferably made of a quantity of sulphur which is smaller, with respect to the quantity of boron in the boronphosphide starting material, than the quantity corresponding to the stoichiometric quantity of boronsulphide of the formula $B_2S_3$. Since at the second place the sulphur is regained and/or obtained as sulphur-phosphorus in the vapour state, it can again react with the boronphosphide at the first place so that the recrystallisation can be completely achieved. The quantity of sulphur may be suitably chosen in accordance with the desired rate of crystallisation. If the crystals to be formed may have very small dimensions, a comparatively large quantity of sulphur may be employed so that the duration of a complete conversion is comparatively short. However, if the crystals have to be of larger size, a very small quantity of sulphur may be employed in order to further a slow growth of the crystals. A complete recrystallisation requires a correspondingly longer duration.

The invention will be described more fully with reference to a few examples and to the accompanying drawing.

*Example I*

In a tubular quartz vessel 1 there is provided 1 gm. of boronsulphide of the formula $B_2S_3$ in the form of small crystals and 0.8 gm. of red phosphorous in the form of small lumps. The vessel 1 is then exhausted and sealed at the end 6.

Figure 1:
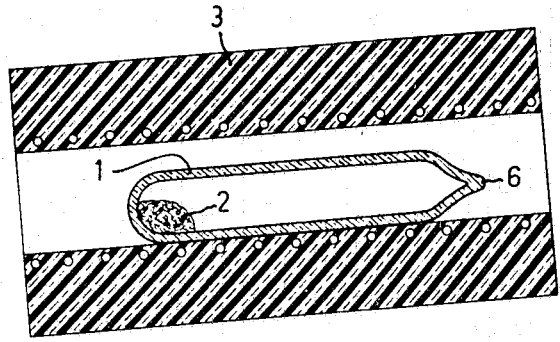
FIGS. 1 and 2 show diagrammatically in a perpendicular sectional view a device employed in the method of producing boronphosphide according to the invention by transport reaction in two stages of the production method.
Figure 2:
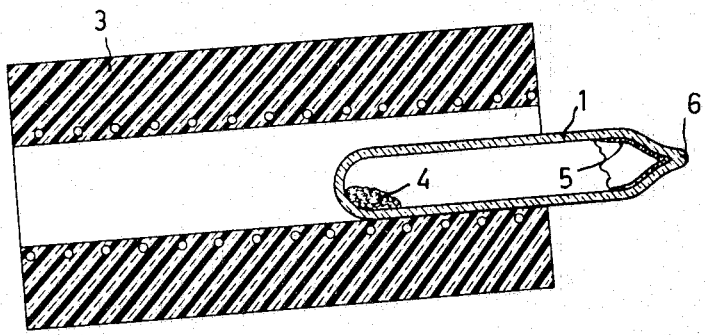
Figure 3:
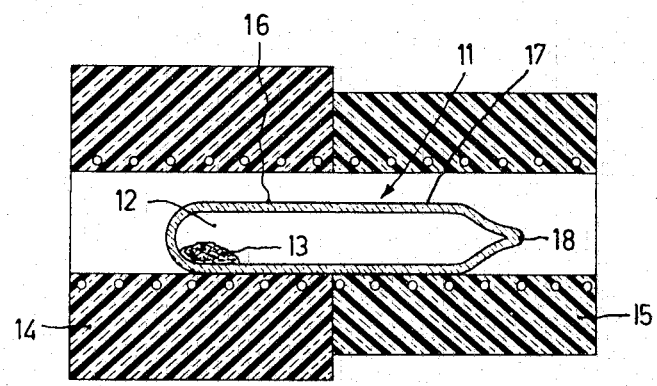
FIG. 3 shows in a perpendicular sectional view a device employed in the recrystallisation of boronphosphide by transport reaction.

The closed vessel 1 is arranged with the quantity 2 of boron-sulphide and phosphorus in a slightly oblique furnace 3 and heated at 500° C. for 12 hours (see FIG. 1) so that by the reaction between phosphorus and boronsulphide boronphosphide is formed. Then the temperature of the furnace is lowered to 400° C. and the vessel 1 is slipped with the sealed end 6 to a small extent out of the furnace 3 so that part of the vessel projects from the furnace and the quantity 4 of boronphosphide obtained as sulphur-phosphorous in the vapour state, it can FIG. 2). Thus a deposit 5 of phosphorus and sulphur is formed, partly or wholly in the form of sulphur-phosphorous compounds, on the cooled wall of the vessel portion projecting from the furnace. After about ten minutes cooling is performed and then the vessel is opened and the quantity 4, then consisting substantially completely of boronphosphide, is removed. The quantity 4 has the form of a porous lump. It is subsequently washed with diluted nitric acid and then with hot deionised water so that the lump is decomposed into a powder of fine crystals of boronphosphide. After drying about 0.7 gm. of boronphosphide is obtained in the form of fine crystals which means a substantially complete conversion of boronsulphide into boronphosphide. A Debije-Scherrer photograph taken with copper $K_\alpha$ radiation exhibits broad lines of the boronphosphide.

*Example II*

The process is the same as that described in Example I, but heating for 12 hours is at 600° C. instead of 500° C. The conversion of boronsulphide is also in this case substantially complete. The Debije-Scherrer diagram of the powder obtained shows slightly narrower lines than the diagram obtained from the powder of Example I, which indicates the formation of slightly larger crystals.

*Example III*

The process is the same as that described in Example I, but heating is performed for 12 hours at a temperature of 700° C. The yield of powdery boronphosphide is again quantitative. The Debije-Scherrer diagram of the powder shows sharper and narrower lines than that of the powder of Example I and of Example II, which exhibits the growth of larger crystals than those obtained in Examples I and II.

Example IV

In a tubular quartz vessel 11 a quantity 13 of 1 gm. of fine crystalline boronphosphide (BP) obtained for example as described in any of the preceding examples and 30 mgms. of sulphur powder are provided at a place 12. The vessel 11 is then exhausted and sealed at its open end. The vessel is then inserted in a horizontal position into two tubular electric furnaces arranged one after the other so that a portion 16 of the vessel with the quantity 13 is located in the furnace 14 and the further portion 17 of the vessel with the sealed end 18 is located in the furnace 15.

The furnace 15 is heated at 600° C. and the furnace 14 is heated simultaneously at 1200° C., at which temperatures the two furnaces are maintained. The quantity 13 gradually decreases and boronphosphide crystals are formed on the wall of the portion 17, said crystals growing gradually. The temperatures are maintained in the furnaces until the quantity 13 has substantially completely vanished. Then the temperature in the furnace 15 is reduced to about 400° C. and the furnace 14 is allowed to cool completely to room temperature. When the furnace 14 has cooled to about 100° C. the temperature in the furnace 15 is maintained at about 400° C. for half an hour, after which the furnace 15 is also allowed to cool. Then in the portion 16 a layer is formed on the wall, which is substantially completely formed by sulphur. The vessel is removed from the furnaces, opened and the crystals formed in the portion 17 are collected, and washed as described in Example I with diluted nitric acid and hot water. The boronphosphide crystals obtained have lengths of the order of 1 cm., widths of the order of 1 mm. and thicknesses of the order of 0.1 mm.

It will be evident that the invention is not restricted to the examples given above and that those skilled in the art may employ many variants; for example other temperatures and other quantities of starting materials may be used without passing beyond the scope of this invention.

What is claimed is:

1. A method for the production of crystals of boron phosphide of the formula BP in a pure crystalline state, comprising reacting boron sulphide in the vapor form with vapors of phosphorus or a compound of phosphorus and sulphur at a temperature between 400° C. and 1100° C.

2. A method as set forth in claim 1 wherein the reaction takes place in a closed vessel, and the temperature exceeds 600° C.

3. A method for the production of boron phosphide crystals of the formula BP in the pure crystalline state, comprising providing in a closed vessel at a first site a supply of boron phosphide and sulphur, maintaining said first site of the vessel at a temperature in excess of 1100° C. to cause the boron phosphide and sulphur to react to form boron sulphide vapor, and phosphorus vapor or vapor compounds of phosphorus and sulphur which will travel to a second site within the vessel, and maintaining said second site at a temperature between 400° C. and 1100° C. to cause the boron sulphide vapor and phosphorus or phosphorus and sulphur compound vapors to react to deposit at said second site single crystals of boron phosphide of the formula BP reforming the sulphur for further reaction with the initial supply.

4. A method as set forth in claim 3 wherein the temperature at said second site is maintained at at least 600° C.

5. A method as set forth in claim 1 wherein the quantity of sulphur present in the initial supply, in proportion to the boron content present, is smaller than the proportion of sulphur to boron corresponding to the stoichiometric quantity in the compound $B_2S_3$.

References Cited

UNITED STATES PATENTS

| | | | |
|---|---|---|---|
| 2,966,426 | 12/1960 | Williams et al. | 23—204 X |
| 2,974,064 | 3/1961 | Williams et al. | 23—204 X |
| 3,073,679 | 1/1963 | Stone et al. | 23—204 |
| 3,094,387 | 6/1963 | Williams | 23—204 |
| 3,197,411 | 7/1965 | Frosch | 252—62.3 |

OTHER REFERENCES

Cotton, "Progress in Inorganic Chemistry," 1962, vol. 3, p. 113.

Frosch, "Journal of the Electrochemical Society," vol. 111, pp. 180–184 (February 1964).

Gmelin-Kraut, "Handbuch der Anorganischen Chemie," 7th Edition, 1911, p. 444.

"Handbook of Chemistry and Physics," 44th Edition, 1962, p. 2379.

Mellor, "Comprehensive Treatise on Inorganic and Theoretical Chemistry," 1928, vol. 8, p. 860.

Mellor, "Comprehensive Treatise on Inorganic and Theoretical Chemistry," vol. 5, 1946, pp. 142–145.

MILTON WEISSMAN, *Primary Examiner.*

UNITED STATES PATENT OFFICE
CERTIFICATE OF CORRECTION

Patent No. 3,357,795                                December 12, 1967

Werner Kischio

It is hereby certified that error appears in the above numbered patent requiring correction and that the said Letters Patent should read as corrected below.

Column 2, line 36, for "tained as sulphur-phosphorus in the vapour state, it can" read -- tained from the quantity 2 remains in the furnace --.

Signed and sealed this 25th day of February 1969.

(SEAL)

Attest:

Edward M. Fletcher, Jr.                          EDWARD J. BRENNER

Attesting Officer                                    Commissioner of Patents